(12) United States Patent
Baralon et al.

(10) Patent No.: US 11,261,734 B2
(45) Date of Patent: Mar. 1, 2022

(54) FAN BLADE

(71) Applicant: ROLLS-ROYCE plc, London (GB)

(72) Inventors: Stephane M M Baralon, Derby (GB); George Crammond, Derby (GB); Stuart Andrews, Derby (GB)

(73) Assignee: ROLLS-ROYCE PLC, London (GB)

(*) Notice: Subject to any disclaimer, the term of this patent is extended or adjusted under 35 U.S.C. 154(b) by 318 days.

(21) Appl. No.: 16/545,011

(22) Filed: Aug. 20, 2019

(65) Prior Publication Data
US 2020/0063569 A1 Feb. 27, 2020

(51) Int. Cl.
*F01D 5/14* (2006.01)
*F04D 29/66* (2006.01)
*F04D 29/32* (2006.01)

(52) U.S. Cl.
CPC ........... *F01D 5/141* (2013.01); *F04D 29/324* (2013.01); *F04D 29/668* (2013.01); *F05D 2260/96* (2013.01)

(58) Field of Classification Search
CPC ... F01D 5/141; F01D 5/14; F01D 5/16; F05D 2260/96; F04D 29/324; F04D 29/32; F04D 29/668; F04D 29/66
See application file for complete search history.

(56) References Cited

U.S. PATENT DOCUMENTS 5,480,285 A * 1/1996 Patel ................. F01D 5/141
416/223 A
8,057,188 B2 * 11/2011 Parker ............... F01D 5/141
416/223 A
9,650,902 B2 * 5/2017 Billings ............. F01D 5/3007
10,215,194 B2 * 2/2019 Theratil ............. F04D 29/666
2004/0081548 A1 * 4/2004 Zess .................. F01D 9/04
415/1

(Continued)

FOREIGN PATENT DOCUMENTS

EP 1 754 859 A2 2/2007
EP 3 361 052 A1 8/2018

OTHER PUBLICATIONS

Search Report of the Intellectual Property Office of the United Kingdom for GB1813666.3 with search date of Feb. 21, 2019.

(Continued)

*Primary Examiner* — Juan G Flores
*Assistant Examiner* — Joshua R Beebe
(74) *Attorney, Agent, or Firm* — Oliff PLC

(57) ABSTRACT

The present disclosure relates to a fan blade for a gas turbine engine, the fan blade comprising an aerofoil portion having a leading edge extending from a root to a tip, the radial distance between the leading edge at the root and the leading edge at the tip defining a blade span. A maximum thickness of the cross-sections through the aerofoil portion from a suction surface of the aerofoil portion to a pressure surface of the aerofoil portion perpendicular to the camber line decreases along the blade span from the root to the tip. There is a discontinuity in the rate of decrease of maximum thickness between a radius at 30% of the blade span from the aerofoil root and 70% of the blade span from the aerofoil root. The rate of decrease of the maximum thickness before the discontinuity is less than the rate of decrease of the maximum thickness after the discontinuity.

19 Claims, 5 Drawing Sheets

(56) References Cited

U.S. PATENT DOCUMENTS

| | | | |
|---|---|---|---|
| 2007/0201983 A1 | 8/2007 | Arinci et al. | |
| 2009/0290987 A1* | 11/2009 | Parker | F01D 5/141 |
| | | | 416/241 R |
| 2012/0051901 A1* | 3/2012 | Lanese | F01D 5/141 |
| | | | 415/208.2 |
| 2013/0052012 A1* | 2/2013 | Kray | F01D 5/3007 |
| | | | 416/2 |
| 2014/0165592 A1* | 6/2014 | Key | F01D 5/141 |
| | | | 60/805 |
| 2016/0003048 A1* | 1/2016 | Gray | F02C 3/04 |
| | | | 60/805 |
| 2018/0231021 A1* | 8/2018 | Wilson | F02K 3/06 |
| 2019/0085704 A1* | 3/2019 | Veitch | F01D 5/16 |

OTHER PUBLICATIONS

Jan. 7, 2020 Search Report issued in European Patent Application No. 19187716.6.

* cited by examiner

FAN BLADE

CROSS-REFERENCE TO RELATED APPLICATIONS

This specification is based upon and claims the benefit of priority from UK Patent Application Number 1813666.3 filed on 22 Aug. 2018, the entire contents of which are incorporated herein by reference.

BACKGROUND

1. Field of the Disclosure

This disclosure relates to a fan blade for a gas turbine engine, a fan stage comprising at least one such fan blade, and a gas turbine engine comprising such a fan stage.

2. Description of the Related Art

Modern gas turbine aero-engines typically comprise a fan, which compresses the incoming air and directs at least a portion of that air along a bypass duct, with the remainder of the air flowing through the engine core. The fan blades of such gas turbine engines may be susceptible to a known phenomenon called flutter. Flutter may occur at certain engine operating conditions, for example certain rotational speeds and/or certain thrusts.

Fan flutter is an aero-elastic instability occurring generally as a non-integral order vibration. When the aerofoils in a blade row (such as the fan blades in a gas turbine engine fan stage) vibrate, they generate unsteady aerodynamic forces on the blade row itself. Under most conditions, these unsteady aerodynamic forces cause the blade row to do work on the surrounding air, and the vibrations decay in amplitude. However, at certain operational conditions, the surrounding air can do work on the fan itself. If the work done by the air exceeds the work dissipated by mechanical damping, then the vibrations will grow. This instability is known as flutter.

The stresses generated through blade flutter can result in high cycle fatigue engine blade failure leading to significant engine damage.

Modern large gas turbine engines are being designed to have lower specific thrust and higher fan tip loading (e.g. dH/Utip2>0.25) than their predecessors. This may be achieved by driving the fan via a gearbox in order to reduce the rotational speed of the fan. Lower specific thrust and/or lower rotational speed and/or higher tip loading may be beneficial from a propulsive efficiency and component efficiency perspective (as the inlet relative Mach numbers onto the fan blade are lower leading to reduced shock losses), but tends to increase the susceptibility of fan blades to experience flutter.

Accordingly, it would be desirable to be able to reduce the susceptibility of the fan blades in an engine to flutter.

SUMMARY

According to a first aspect there is provided a fan blade for a gas turbine engine, the fan blade comprising an aerofoil portion having a leading edge extending from a root to a tip, the radial distance between the leading edge at the root and the leading edge at the tip defining a blade span, wherein a maximum thickness of the cross-sections through the aerofoil portion from a suction surface of the aerofoil portion to a pressure surface of the aerofoil portion perpendicular to the camber line decreases along the blade span from the root to the tip wherein there is a discontinuity in the rate of decrease of maximum thickness between a radius at 30% of the blade span from the aerofoil root and 70% of the blade span from the aerofoil root and wherein the rate of decrease of the maximum thickness before the discontinuity (which may be referred to as a radially inboard side of the discontinuity) is less than the rate of decrease of the maximum thickness after the discontinuity (which may be referred to as a radially outboard side of the discontinuity).

Without being bound by any particular theory, the present inventors have understood that the susceptibility of a blade to flutter may depend at least in part on the frequency and mode shape of the first and second vibration modes of the blade. For example, in general a higher first and/or second modal frequency may reduce fan blade susceptibility to flutter.

Providing a discontinuity with a transition from a lower rate of decrease of maximum thickness to a higher rate of decrease of maximum thickness at between 30 and 70% of the blade span from the aerofoil root results in a bump or shoulder at between 30 and 70% of the blade span. Without wishing to be bound by any theory, it is believed that this bump/shoulder at the defined position stabilises the untwist deflections of the fan blade and increases the frequency of the second vibration mode thus reducing susceptibility to flutter.

By providing a blade that is less susceptible to flutter, it may be possible, for example, to operate a gas turbine engine comprising such blades in a more efficient engine cycle.

Reference to a cross-section through an aerofoil at a given percentage along the blade span may mean a section through the aerofoil in a plane defined by: a line that passes through the point on the leading edge that is at that percentage along the leading edge from the leading edge root and points in the direction of the tangent to the circumferential direction at that point on the leading edge; and a point on the trailing edge that is at that same percentage along the trailing edge from the trailing edge root.

Alternatively, reference to a cross-section through an aerofoil at a given radial percentage along the blade span may mean a section through the aerofoil that is perpendicular to the radial direction at that radial percentage along the leading edge.

Where reference is made to the axial, radial and circumferential directions, the skilled person will readily understand this to mean the conventional directions when the fan blade is assembled as part of a fan stage or is provided in a gas turbine engine. Viewing the blade along a circumferential direction may mean viewing the blade in side profile and/or in the meridional plane and/or projected onto a plane defined by the axial and radial directions.

In some embodiments, the rate of decrease of maximum thickness from the radius at 30% of the blade span from the aerofoil root to the discontinuity is substantially zero i.e. the maximum thickness from the radius at 30% of the blade span from the aerofoil root to the radius at which the discontinuity occurs is substantially constant.

In some embodiments, the discontinuity occurs at a radius around 50% of the blade span from the aerofoil root. In these embodiments, the maximum thickness between a radius of 30 and 50% of the blade span from the aerofoil root may be substantially constant.

In some embodiments, the rate of decrease of the maximum thickness from the radius at which the discontinuity occurs (e.g. at a radius at 50% of the blade span from the aerofoil root) to a radius at 70% of the blade span from the aerofoil root is substantially constant i.e. there is a smooth, continuous decrease in maximum thickness from the bump/shoulder created by the discontinuity.

In some embodiments, the rate of decrease of the maximum thickness from the aerofoil root to the radius at 30% of the blade span from the aerofoil root is constant i.e. there is a smooth, continuous decrease in maximum thickness from the aerofoil root to the radius at 30% of the blade span from the aerofoil root.

In some embodiments, the rate of decrease of the maximum thickness from the aerofoil root to the radius at 30% of the blade span from the aerofoil root is greater than the rate of decrease of the maximum thickness from the radius at 30% of the blade span from the aerofoil root to the radius at which the discontinuity occurs i.e. there is a second discontinuity at a radius of around 30% of the blade span from the aerofoil root wherein the rate of decrease of the maximum thickness before the second discontinuity is greater than the rate of decrease of the maximum thickness after the second discontinuity.

In some embodiments, the maximum thickness at a radius around 30% of the blade span from the aerofoil root is between 30-40% lower than the maximum thickness at the aerofoil root.

In some embodiments, the maximum thickness at a radius greater than 70% of the blade span from the aerofoil root is substantially constant. In some embodiments, the maximum thickness at a radius greater than 70% of the blade span from the aerofoil root is around 70% lower than the maximum thickness at the aerofoil root. This reduces the weight of the fan blade and has been found to increase the first vibration frequency thus further reducing flutter.

The fan blade may comprise a platform radially inwards from the aerofoil portion and configured for mounting on a hub. The fan blade may comprise a root portion extending between the platform (at an edge-of-bedding line) and the root of the aerofoil portion (at a hub line). Alternatively, the aerofoil portion may extend directly from the platform, with no intermediate root portion, such that the root of the aerofoil foil portion is the root of the fan blade.

Where the fan blade comprises a root portion, the radial extent of the root portion may be no more than 15% for example no more than 10%, 7%, 5%, 3%, 2% or 1%, of the blade span of the aerofoil portion, for example.

In some embodiments, a maximum thickness of the cross-sections through the root portion from a suction surface of the root portion to a pressure surface of the root portion perpendicular to the camber line decreases from the platform to the root of the aerofoil portion.

This has been found to increase the first vibration frequency and thus further reduce susceptibility to flutter.

In some embodiments, the rate of decrease in the maximum thickness of the root portion from the platform (at the edge-of-bedding) to the aerofoil root (at the hub line) is substantially constant i.e. there is a smooth, continuous decrease in maximum thickness from the platform to the aerofoil root.

In some embodiments, the rate of decrease of the maximum thickness from the platform to the aerofoil root is less than the rate of decrease of the maximum thickness from the aerofoil root to 30% of the blade span from the aerofoil root i.e. there is a third discontinuity at the aerofoil root (hub line) wherein the rate of decrease of the maximum thickness before the third discontinuity is less than the rate of decrease of the maximum thickness after the third discontinuity.

In some embodiments, there is up to a 15% decrease in the maximum thickness from the platform to the aerofoil root.

In other embodiments, the maximum thickness of the root portion may be substantially constant.

Providing the third discontinuity with a transition from a lower rate of decrease of maximum thickness/constant maximum thickness to a higher rate of decrease of maximum thickness results in a second bump or shoulder at the hub line.

According to a second aspect, there is provided a fan stage for a gas turbine engine comprising a plurality of fan blades according to the first aspect. The fan stage may comprise a hub, from which the fan blades may extend, for example in a radial direction.

Such a hub may be, or may comprise, a fan disc which may be driven by a shaft. The shaft itself may be driven by a turbine of a gas turbine engine.

The fan blades may be attached to the hub in any desired manner. For example, as discussed above, each fan blade may comprise a platform which may engage a corresponding slot in the hub (or disc). Purely by way of example, such a platform may be in the form of a dovetail that may slot into and/or engage a corresponding slot in the hub/disc in order to fix the fan blade to the hub/disc.

By way of further example, the fan blades maybe formed integrally with a hub. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

By way of further example, the fan blades may be attached to a hub in a manner that allows their pitch to be varied.

In any arrangement of fan stage, the ratio of the radius of the position where the leading edge of one of the fan blades meets the hub to the outermost radial extent of the leading edge of the fan blade is less than 0.4, for example less than 0.37, for example less than 0.35, for example less than 0.33, for example less than 0.3, for example less than 0.25. This may be referred to as the hub-to-tip ratio and/or may be the same as the ratio of the radius of the root at the leading edge of the aerofoil portion to the radius of the tip at the leading edge of the aerofoil portion, for example where the fan blade is not provided with a root portion or a tip portion.

According to a third aspect, there is provided a gas turbine engine comprising at least one fan blade according to the first aspect and/or a fan stage according to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine comprises fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.25, 0.26, 0.27, 0.28, 0.29, 0.3, 0.31, 0.32, 0.33, 0.34, 0.35, 0.36, 0.37, 0.38, 0.39 or 0.4 (all units in this paragraph being dimensionless). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

The fan of a gas turbine as described and/or claimed herein may have any desired number of fan blades, for example 16, 18, 20, or 22 fan blades.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
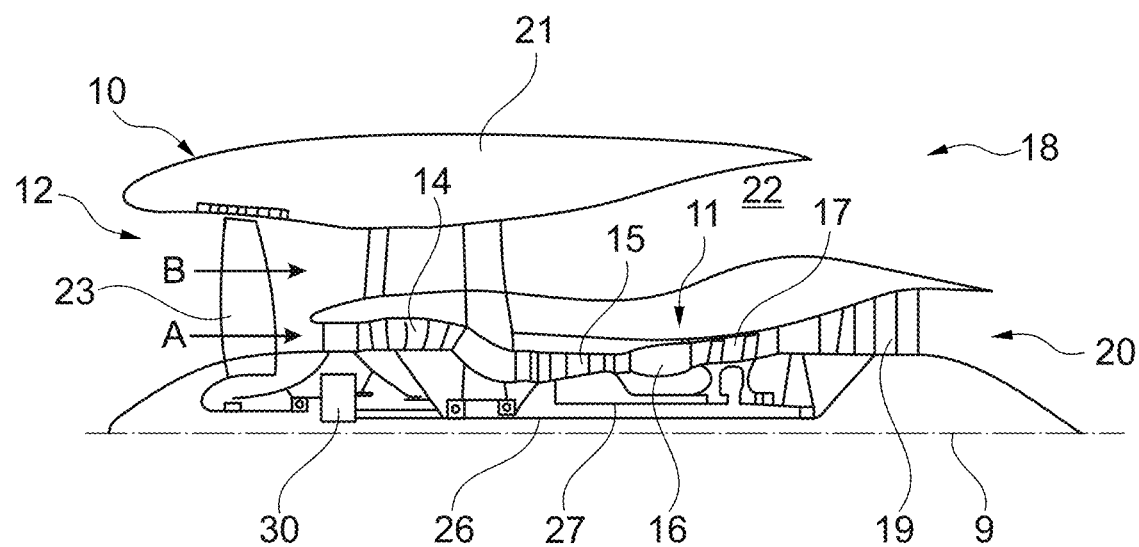
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
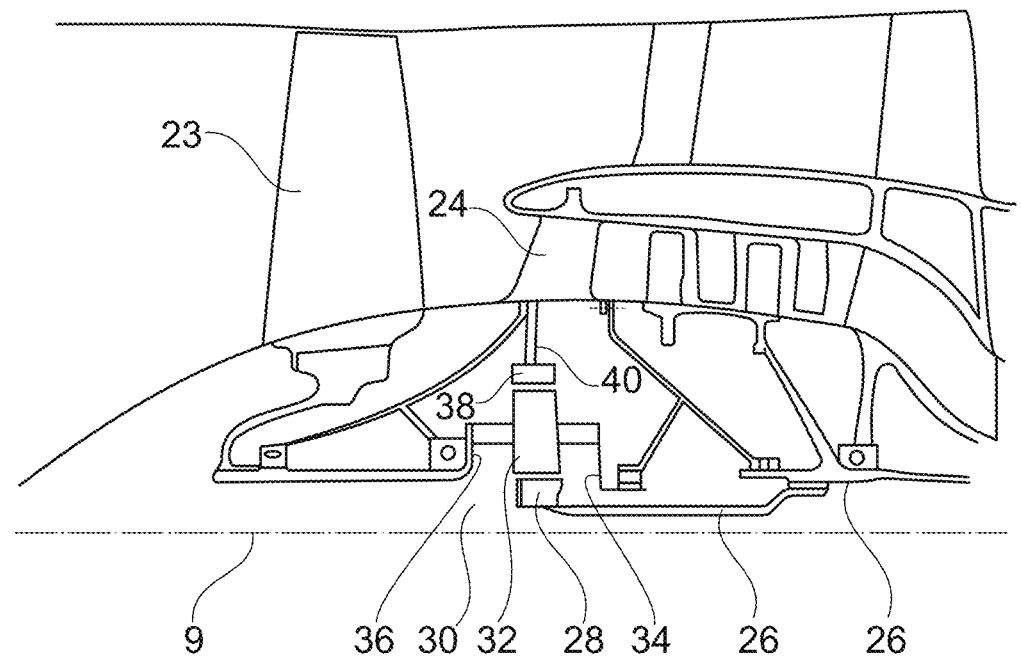
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
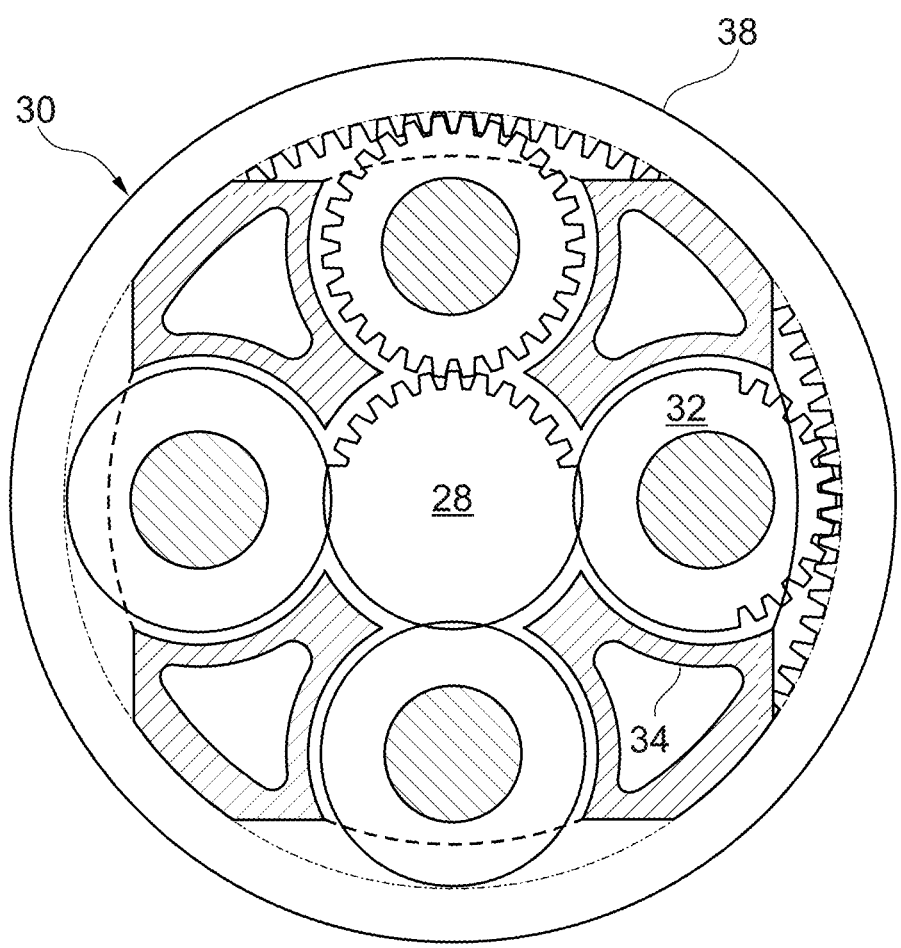
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
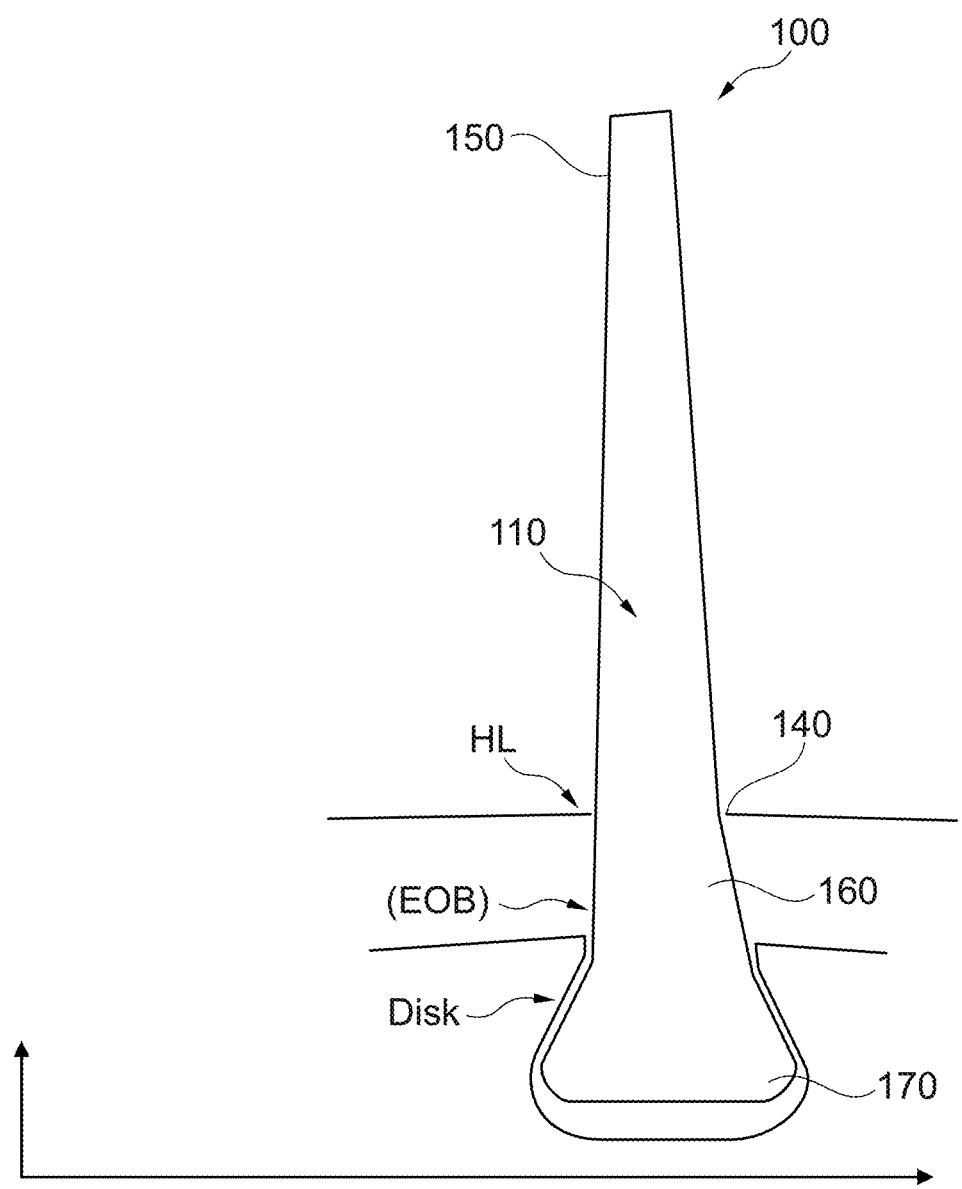
FIG. 4 is a cross-section through a fan blade.
Figure 5:
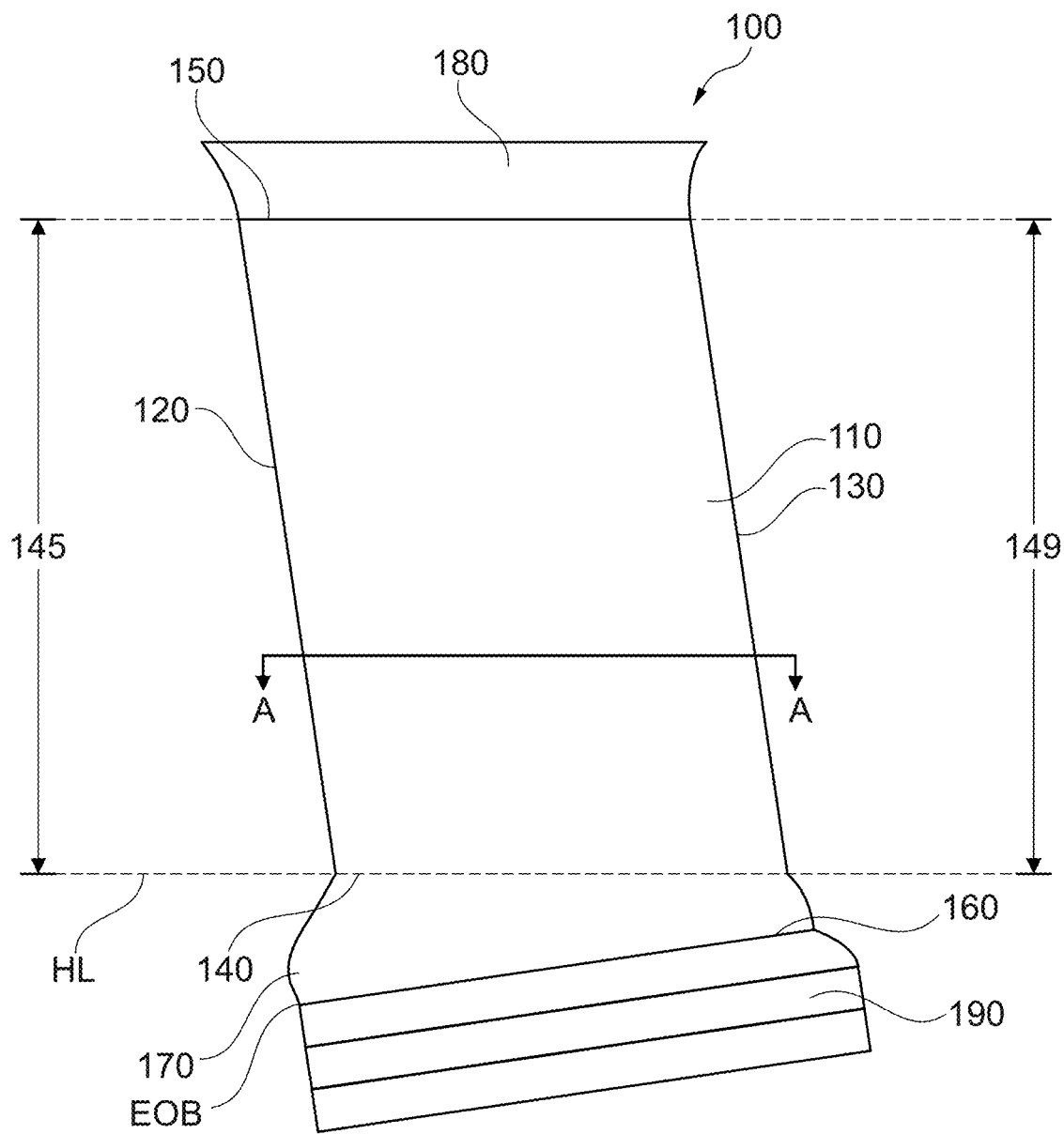
FIG. 5 is a cross-section through the fan blade.

FIG. 4 is a cross-section through a fan blade 100 and FIG. 5 is a side view (that is, a view in the axial-radial plane) of the fan blade 100. The fan blade 100 has an aerofoil portion 110. The aerofoil portion 110 has a leading edge 120 and a trailing edge 130. The aerofoil portion 110 extends from a root 140 to a tip 150 in a substantially radial spanwise direction. The leading edge 110 may be defined as the line defined by the axially forwardmost points of the aerofoil portion 110 from its root 140 to its tip 150.

A radial span 145 is defined as the distance in the radial direction between the leading edge 120 at the root 140 and the leading edge 120 at the tip 150. A trailing edge span 149 may be defined between the trailing edge 130 at the root 140 and the tip 150.

Figure 6:
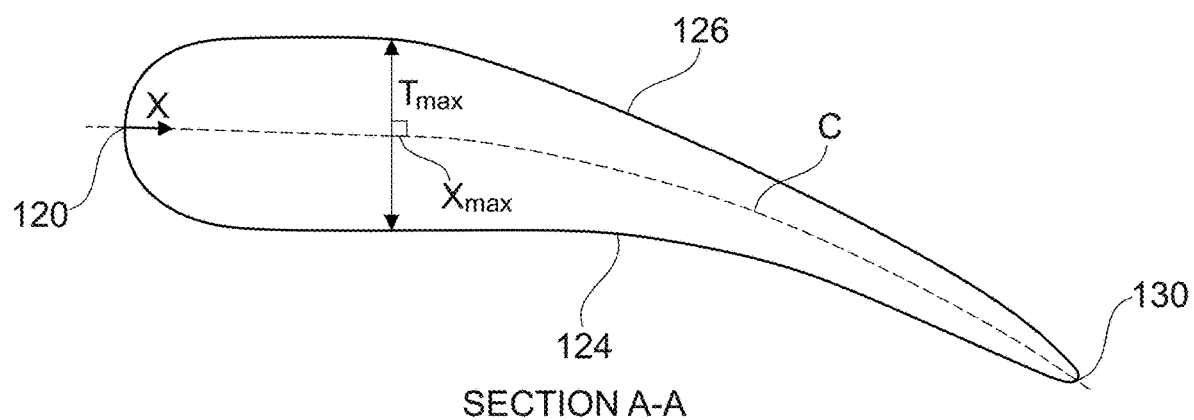
FIG. 6 is a cross section along line A-A shown in FIG. 5.

A cross section A-A through the aerofoil portion 110 within the radial extent labelled 146 is indicated by arrows A-A in FIG. 5, and shown in FIG. 6. The cross-section A-A passes through a point that is between 20% and 40% of the blade span 145 from the leading edge root and a point that is the same percentage of the trailing edge span 149 from the trailing edge root.

The fan blade 100 comprises a platform 160 and a root portion 170. The root portion 170 extends between the platform 160 (from an edge of bedding line EOB) and the root 140 of the aerofoil portion 110 (at a hub line HL). The radial extent of the root portion 170 may be, for example, no more than 7%, for example no more than 5%, of the span of the aerofoil portion 110.

It will be appreciated that cross-sections through the blade (for example cross-section A-A) may or may not be perpendicular to the radial direction, for example depending on the relative shapes and/or extents of the leading edge 120 and the trailing edge 130.

The cross-section A-A has a camber line C (which may alternatively be referred to as a mean line). The camber line C may be defined as a line formed by the points equidistant from the pressure surface 124 and the suction surface 126. The distance along the camber line C from the leading edge 120 is indicated by the letter x in FIG. 6. The total length of the camber line C is the length of the dashed line between the leading edge 120 and the trailing edge 130.

The thickness T at a given position x along the camber line C may be defined as the length of a line that is perpendicular to the camber line C at the location x and extends from the pressure surface 124 to the suction surface 126. The maximum thickness Tmax is the maximum length of the line perpendicular to the camber line C and extending from the pressure surface 124 to the suction surface 126.

As shown in FIG. 5, regardless of the whether the fan blade 100 comprises a root portion 170, the blade span 145 (and the trailing edge blade span 149) is defined between the root 140 and the tip 150 of the aerofoil.

Figure 7:
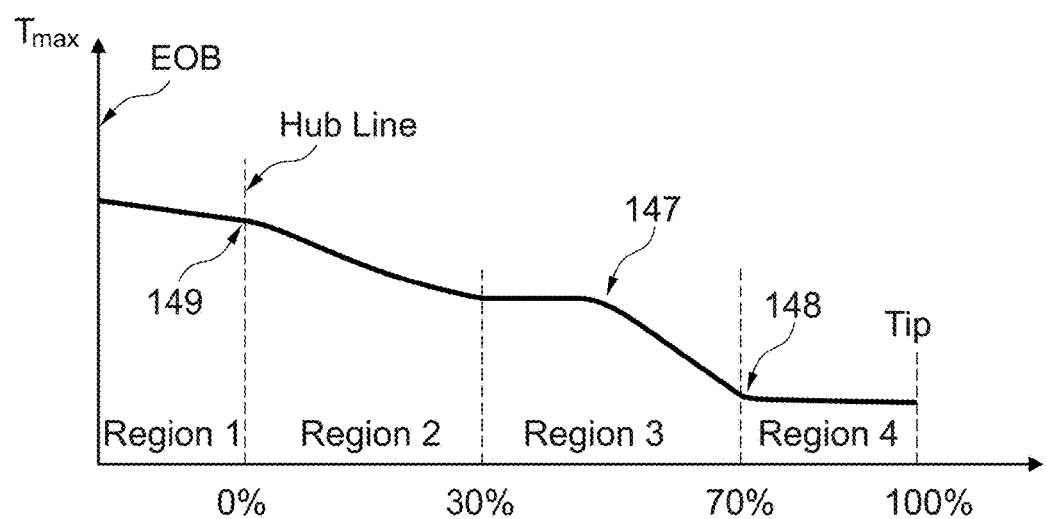
FIG. 7 is a schematic graph showing the variation in maximum thickness against position along the blade span.

FIG. 7 shows how the maximum thickness Tmax varies along the blade span. It can be seen that the maximum thickness decreases generally from the root portion 170 to the root 140 to the tip 150.

There is a discontinuity 147 in the rate of decrease of maximum thickness in a mid-section (region 3) of the aerofoil portion 110 between a radius at 30 and 70% of the blade span 145 from the aerofoil root 140 and wherein the rate of decrease of the maximum thickness before the discontinuity is less than the rate of decrease of the maximum thickness after the discontinuity 147.

The rate of decrease of maximum thickness Tmax from the radius at 30% of the blade span 145 from the aerofoil root 140 to the discontinuity 147 is substantially zero i.e. the maximum thickness Tmax from the radius at 30% of the blade span 145 from the aerofoil root 140 to the radius at which the discontinuity 147 occurs is substantially constant.

The discontinuity 147 occurs at a radius around 50% of the blade span 147 from the aerofoil root 140.

The rate of decrease of the maximum thickness Tmax from a radius at 50% of the blade span 145 from the aerofoil root 140 to a radius at 70% of the blade span 145 from the aerofoil root 140 is substantially constant i.e. there is a smooth, continuous decrease in maximum thickness from the bump/shoulder created by the discontinuity 147.

Providing a discontinuity 147 with a transition from a lower rate of decrease of maximum thickness Tmax to a higher rate of decrease of maximum thickness at around 50% of the blade span 145 from the aerofoil root 140 results in a bump or shoulder at around 50% of the blade span 145. It is believed that this bump/shoulder at the defined position stabilises the untwist deflections of the fan blade and increases the frequency of the second vibration mode thus reducing susceptibility to flutter.

The rate of decrease of the maximum thickness Tmax in a root section (region 2) from the aerofoil root 140 to the radius at 30% of the blade span 145 from the aerofoil root 140 is constant i.e. there is a smooth, continuous decrease in maximum thickness Tmax from the aerofoil root 140 to the mid-section (region 3) of the aerofoil portion 110.

The rate of decrease of the maximum thickness Tmax from the aerofoil root 140 to the radius at 30% of the blade span 145 from the aerofoil root 140 (i.e. across the root section of the aerofoil portion) is greater than the rate of decrease of the maximum thickness Tmax from the radius at 30% of the blade span 145 from the aerofoil root 140 to the radius at which the discontinuity 147 occurs i.e. there is a second discontinuity 148 at a radius of around 30% of the blade span 145 from the aerofoil root 140 wherein the rate of decrease of the maximum thickness Tmax before the second discontinuity 148 is greater than the rate of decrease of the maximum thickness Tmax after the second discontinuity 148.

The maximum thickness Tmax at the radius around 30% of the blade span 145 from the aerofoil root 140 is between 30-40% lower than the maximum thickness Tmax at the aerofoil root 140. In other words, the maximum thickness decreases by 30-40% over the root section (region 2) of the aerofoil portion 100.

The maximum thickness Tmax at a radius greater than 70% of the blade span 140 from the aerofoil root 140 i.e. in a tip section (region 4) of the aerofoil portion 110 is substantially constant and around 70% lower than the maximum thickness at the aerofoil root 140. This reduces the weight of the fan blade and has been found to increase the first vibration frequency thus further reducing flutter.

The maximum thickness of the cross-sections through the root portion (region 1) from a suction surface of the root portion 170 to a pressure surface of the root portion perpendicular to the camber line decreases from the platform 160 to the aerofoil root 140 (although in other embodiments, it remains constant).

The rate of decrease in the maximum thickness Tmax of the root portion 170 from the platform 160 (at the edge-of-bedding EOB) to the aerofoil root 140 (at the hub line HL) is substantially constant i.e. there is a smooth, continuous decrease in maximum thickness Tmax from the platform 160 to the aerofoil root 140.

The rate of decrease of the maximum thickness Tmax from the platform 160 to the aerofoil root 140 (i.e. across the root portion 170 is less than the rate of decrease of the maximum thickness Tmax from the aerofoil root 140 to 30% of the blade span 145 from the aerofoil root 140 i.e. across the root section (region 2) of the aerofoil portion i.e. there is a third discontinuity 149 at the aerofoil root 140 (hub line HL) wherein the rate of decrease of the maximum thickness Tmax before the third discontinuity 149 is less than the rate of decrease of the maximum thickness Tmax after the third discontinuity 149.

There is up to a 15% decrease in the maximum thickness Tmax from the platform 160 to the aerofoil root 140.

Providing the third discontinuity 149 with a transition from a lower rate of decrease of maximum thickness Tmax to a higher rate of decrease of maximum thickness across the root portion (from the edge of bedding (EOB) to the hub line (HB)) results in a second bump or shoulder. It is believed that this second bump/shoulder at the defined position increases the first vibration frequency and thus further reduces susceptibility to flutter.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
    an engine core comprising a turbine, a compressor, and a core shaft connecting the turbine to the compressor;
    a fan upstream of the engine core, wherein:
    the fan comprises a plurality of fan blades, each fan blade comprising an aerofoil portion having a leading edge extending from an aerofoil root to a tip, a radial distance between the leading edge at the aerofoil root and the leading edge at the tip defining a blade span,
    a maximum thickness of cross-sections through the aerofoil portion from a suction surface of the aerofoil portion to a pressure surface of the aerofoil portion perpendicular to a camber line decreases along the blade span from the aerofoil root to the tip,
    there is a discontinuity in a rate of decrease of maximum thickness between a radius at 30% and 70% of the blade span from the aerofoil root, and
    the rate of decrease of the maximum thickness before the discontinuity is less than the rate of decrease of the maximum thickness after the discontinuity,
    the maximum thickness of the fan blade at a radius greater than 70% of the blade scan from the aerofoil root is substantially constant.

2. The gas turbine engine according to claim 1 wherein the rate of decrease of maximum thickness of the fan blade from the radius at 30% of the blade span from the aerofoil root to the discontinuity is substantially zero.

3. The gas turbine engine according to claim 1 wherein the discontinuity of the fan blade occurs at a radius around 50% of the blade span from the aerofoil root.

4. The gas turbine engine according to claim 1 wherein the rate of decrease of the maximum thickness of the fan blade from the radius at which the discontinuity occurs to a radius at 70% of the blade span from the aerofoil root is substantially constant.

5. The gas turbine engine according to claim 1 wherein the rate of decrease of the maximum thickness of the fan blade from the aerofoil root to the radius at 30% of the blade span from the aerofoil root is smooth and continuous.

6. The gas turbine engine according to claim 1 wherein the rate of decrease of the maximum thickness of the fan blade from the aerofoil root to the radius at 30% of the blade span from the aerofoil root is greater than the rate of decrease of the maximum thickness from the radius at 30% of the blade span from the aerofoil root to the radius at which the discontinuity occurs such that there is a second discontinuity at a radius of around 30% of the blade span from the aerofoil root wherein the rate of decrease of the maximum thickness before the second discontinuity is greater than the rate of decrease of the maximum thickness after the second discontinuity.

7. The gas turbine engine according to claim 1 wherein the maximum thickness of the fan blade at a radius around 30% of the blade span from the aerofoil root is between 30-40% lower than the maximum thickness at the aerofoil root.

8. The gas turbine engine according to claim 1 wherein the maximum thickness of the fan blade at a radius greater than 70% of the blade span from the aerofoil root is 70% lower than the maximum thickness at the aerofoil root.

9. The gas turbine engine according to claim 1, wherein the fan blade further comprises a platform radially inwards from the aerofoil portion and a root extending between the platform and the aerofoil root, wherein a maximum thickness of the cross-sections through the root from a suction surface of the root to a pressure surface of the root perpendicular to the camber line decreases from the platform to the aerofoil root.

10. The gas turbine engine according to claim 9 wherein the rate of decrease in the maximum thickness of the root from the platform to the aerofoil root is substantially constant.

11. The gas turbine engine according to claim 9 wherein the rate of decrease of the maximum thickness of the fan blade from the platform to the aerofoil root is less than the rate of decrease of the maximum thickness from the aerofoil root to 30% of the blade span from the aerofoil root such that there is a third discontinuity at the aerofoil root wherein the rate of decrease of the maximum thickness before the third discontinuity is less than the rate of decrease of the maximum thickness after the third discontinuity.

12. The gas turbine engine according to claim 9 wherein there is up to a 15% decrease in the maximum thickness from the platform to the aerofoil root.

13. The gas turbine engine according to claim 1, wherein the fan diameter is no greater than 390 cm.

14. The gas turbine engine according to claim 1, wherein at cruise conditions, specific thrust of the gas turbine engine is from 60 Nkg$^{-1}$ s to 100 Nkg$^{-1}$ s.

15. The gas turbine engine according to claim 1, further comprising:

a gearbox (30) that receives an input from the core shaft (26) and outputs drive to the fan so as to drive the fan at a lower rotational speed than the core shaft.

16. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

17. The gas turbine engine according to claim 1, wherein the discontinuity stabilises untwist deflections of the fan blade.

18. The gas turbine engine according to claim 1, wherein the discontinuity increases frequency of a second vibration mode of the fan blade.

19. The gas turbine engine according to claim 1, wherein the diameter of the fan is at least 250 cm and less than or equal to 390 cm.

* * * * *